(12) United States Patent
Padebettu

(10) Patent No.: US 12,088,676 B2
(45) Date of Patent: Sep. 10, 2024

(54) INTEGRATED BROADBAND NETWORK GATEWAY (BNG) DEVICE FOR PROVIDING A BNG CONTROL PLANE FOR ONE OR MORE DISTRIBUTED BNG USER PLANE DEVICES

(71) Applicant: Juniper Networks, Inc., Sunnyvale, CA (US)

(72) Inventor: Venkatesh Padebettu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 404 days.

(21) Appl. No.: 17/584,729

(22) Filed: Jan. 26, 2022

(65) Prior Publication Data

US 2023/0239359 A1     Jul. 27, 2023

(51) Int. Cl.
     *H04L 67/141*     (2022.01)
     *H04L 41/0803*     (2022.01)

(52) U.S. Cl.
     CPC ........ *H04L 67/141* (2013.01); *H04L 41/0803* (2013.01)

(58) Field of Classification Search
     CPC . H04L 67/141; H04L 41/0803; H04L 12/287; H04L 67/1097; H04W 88/16
     See application file for complete search history.

(56) References Cited

U.S. PATENT DOCUMENTS

| | | | |
|---|---|---|---|
| 2022/0217569 A1* | 7/2022 | Yu | H04W 28/0257 |
| 2022/0286901 A1* | 9/2022 | Sun | H04L 65/1069 |
| 2023/0018346 A1* | 1/2023 | Peng | H04W 48/16 |
| 2023/0139924 A1* | 5/2023 | Qiao | H04W 36/0072 370/331 |
| 2023/0164591 A1* | 5/2023 | Sun | H04M 15/62 370/259 |
| 2023/0189157 A1* | 6/2023 | Fan | H04B 7/0691 370/311 |
| 2023/0208679 A1* | 6/2023 | Niu | H04L 43/10 370/254 |

OTHER PUBLICATIONS

Extended European Search Report for Application No. EP22162727.6, mailed on Sep. 15, 2022, 10 pages.

(Continued)

*Primary Examiner* — Michael A Keller
*Assistant Examiner* — Thao D Duong
(74) *Attorney, Agent, or Firm* — Harrity & Harrity, LLP

(57) ABSTRACT

In some implementations, an integrated broadband network gateway (BNG) device may communicate management information with a particular distributed BNG user plane device. The integrated BNG device may communicate control packets with the particular distributed BNG user plane device. The integrated BNG device may communicate session control and state information with the particular distributed BNG user plane device. The management information, the control packets, and the session control and state information may be communicated via respective interfaces between the integrated BNG device and the particular distributed BNG user plane device. Accordingly, the integrated BNG device may provide a BNG control plane for the particular distributed BNG user plane device.

20 Claims, 8 Drawing Sheets

(56) References Cited

OTHER PUBLICATIONS

Huand et al., "VXLAN GPE Extension for Packets Exchange Between Control and User Plane of vBNG; draft-huang-nvo3-vxlan-gpe-extension-for-vbng-00.txt", Internet-draft: NV03, Internet Engineering Task Force, IETF; Standard working draft, Internet Society (ISOC) 4, RUED, Jul. 17, 2017, pp. 1-9, XP015120960.

Huawei., "Technical White Paper on Cloud-based BNG with Control Plane and User Plane Separated Architecture", Feb. 25, 2017, p. 1, XP055803822, Retrieved from the Internet: URL:https://carrier.huawei.com/~/media/CNBG/Downloads/track/CU-Separated-BNG-Architecture_EN.pdf.

Wang et al., "Information Model of Control-Plane and User-Plane separation BNG; draft-wog-i2rs-cu-separation-infor-model-00.txt", Internet Engineering Task Force, IETF; Standard working draft, Internet Society (ISOC) 4, Rue Des Falaises Ch-1205 Geneva, Switzerland, Mar. 13, 2017 (Mar. 13, 2017), pp. 1-19, XP015118593.

"TR-459.3 Multi-Service Disaggregated BNG with CUPS: IPTV Multicast function—Reference Architecture Deployment Models, Interface and Protocol Specifications"; Technical Report; Aug. 2021; pp. 1-24; Issue 1; Broadband Forum.

"TR-459 Control and User Plane Separation for a disaggregated BNG"; Technical Report; pp. 1-102; Jun. 2020; Issue 1; Broadband Forum.

\* cited by examiner

INTEGRATED BROADBAND NETWORK GATEWAY (BNG) DEVICE FOR PROVIDING A BNG CONTROL PLANE FOR ONE OR MORE DISTRIBUTED BNG USER PLANE DEVICES

BACKGROUND

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QoS) policies, among other examples.

SUMMARY

In some implementations, a non-transitory computer-readable medium storing a set of instructions includes one or more instructions that, when executed by one or more processors of an integrated broadband network gateway (BNG) device, cause the integrated BNG device to: communicate management information with a particular distributed BNG user plane device via a first interface between the integrated BNG device and the particular distributed BNG user plane device; communicate control packets with the particular distributed BNG user plane via a second interface between the integrated BNG device and the particular distributed BNG user plane device; and communicate session control and state information with the particular distributed BNG user plane device via a third interface between the integrated BNG device and the particular distributed BNG user plane device.

Some implementations described herein relate to an integrated BNG device for providing a BNG control plane for one or more distributed BNG user plane devices. The integrated BNG device may include one or more memories and one or more processors. The integrated BNG device may be configured to communicate management information with a particular distributed BNG user plane device of the one or more distributed BNG user plane devices, wherein the management information is communicated via a first interface between the integrated BNG device and the particular distributed BNG user plane device. The integrated BNG device may be configured to communicate control packets with the particular distributed BNG user plane device, wherein the control packets is communicated via a second interface between the integrated BNG device and the particular distributed BNG user plane device. The integrated BNG device may be configured to communicate session control and state information with the particular distributed BNG user plane device, wherein the session control and state information is communicated via a third interface between the integrated BNG device and the particular distributed BNG user plane device.

Some implementations described herein relate to a method for providing a BNG control plane for a particular distributed BNG user plane device. The method may include communicating, by an integrated BNG device, management information with the particular distributed BNG user plane device. The method may include communicating, by the integrated BNG device, control packets with the particular distributed BNG user plane device. The method may include communicating, by the integrated BNG device, session control and state information with the particular distributed BNG user plane device.

DETAILED DESCRIPTION

Figure 1A:
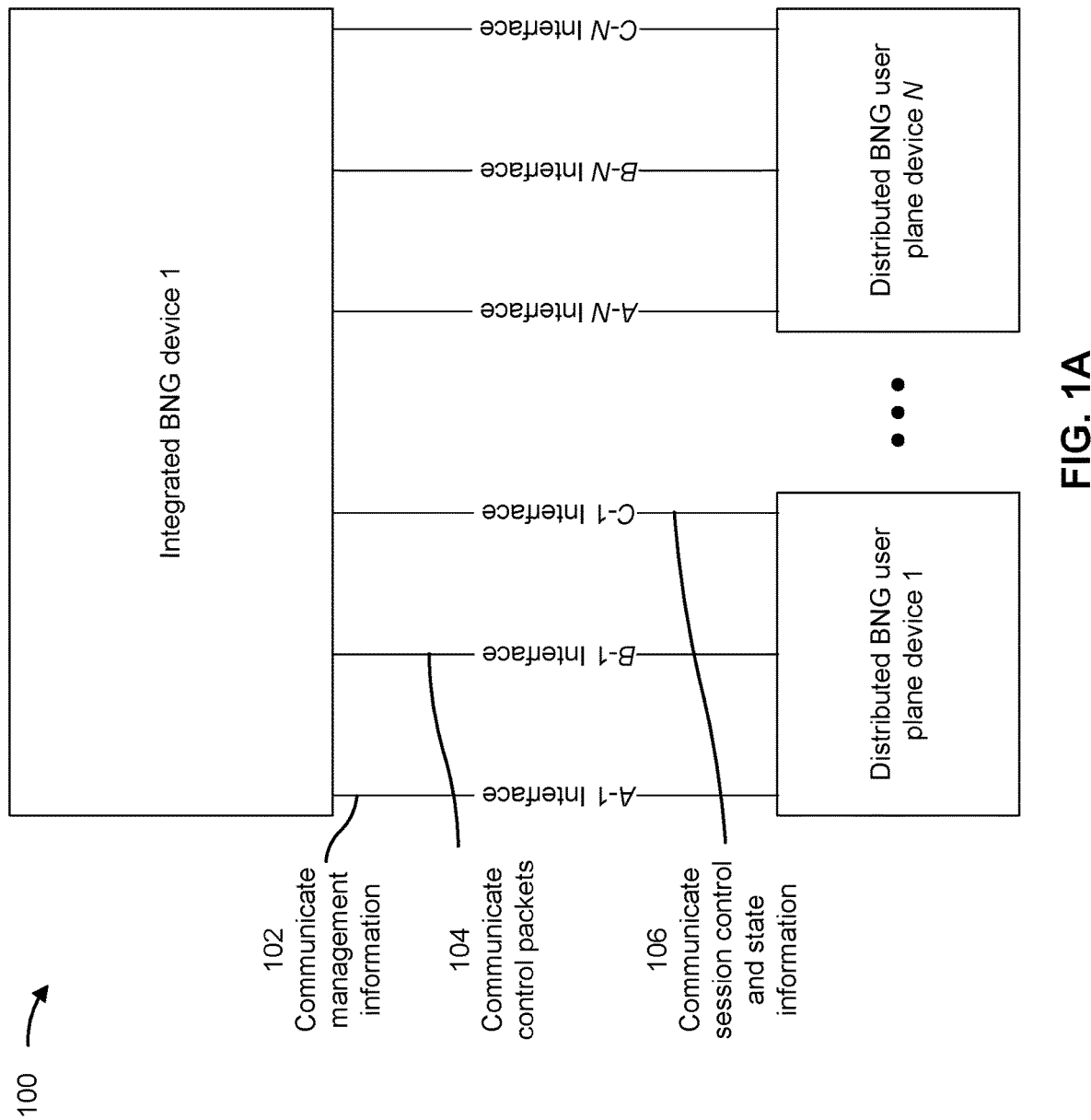
FIGS. 1A-1D are diagrams of an example implementation described herein.

The following detailed description of example implementations refers to the accompanying drawings. The same reference numbers in different drawings may identify the same or similar elements.

To accommodate growth in a quantity of subscribers, a quantity and types of services being provided by BNGs, and an amount of traffic being processed by BNGs, a disaggregated BNG, also termed a distributed BNG, may be deployed by a service provider. The distributed BNG physically and logically separates a control plane and a user plane (also termed a "data plane"). For example, software to perform control plane functions may be distributed for execution by a cloud of servers as virtualized BNG functions. Devices to implement the user plane, which may include physical network devices or virtual user plane devices, remain in a forwarding path between access networks and a data network to process packet flows according to subscriber forwarding state rules programmed by the control plane.

However, in many cases, a service provider has already deployed a BNG using a number of integrated BNG devices, where each integrated BNG device provides control plane functionality and user plane functionality. Consequently, the BNG cannot be easily configured to be a distributed BNG because each integrated BNG device provides independent control plane and user plane functionality for the BNG. For example, introducing a cloud of servers to universally provide control plane functions would bring down the BNG for a significant period of time (e.g., multiple hours or days) to configure separation of a control plane and a user plane.

Some implementations described herein provide an integrated BNG device that provides a BNG control plane for one or more distributed BNG user plane devices. That is, the integrated BNG device provides a control plane for one or more user planes provided by the integrated BNG device and also provides the control plane for the one or more distributed BNG user plane devices (e.g., where each distributed BNG user plane device provides one or more user planes). Further, the integrated BNG device communicates management information, control packets, and session control and state information via respective interfaces between the integrated BNG device and each of the one or more distributed BNG user plane devices to provide the control plane for the one or more distributed BNG user plane devices.

In this way, individual integrated BNG devices can be configured to provide a BNG control plane for one or more distributed BNG user plane devices, which can be added incrementally over time, while also providing the control plane for one or more user planes of the integrated BNG device. This allows for an incremental migration to a distributed BNG configuration and therefore prevents packet loss, traffic blackholing, device errors and/or failures, and/or processing downtime that would otherwise be associated with introducing a cloud of servers to universally provide control plane functions at one particular time. Further, in some implementations, multiple integrated BNG devices may communicate with each other to enable load balancing of distributed BNG user plane devices among the integrated BNG devices (e.g., to prevent overloading of a particular integrated BNG device as a BNG control plane for a set of distributed BNG user plane devices). This minimizes inefficient use of respective computing resources (e.g., processing resources, memory resources, communication resources, and/or power resources, among other examples) of the integrated BNG devices. This improves a performance of the BNG and is not otherwise possible using a single cloud implementation.

FIGS. 1A-1D are diagrams of one or more example implementations 100 described herein relating to a distributed BNG environment. Example implementation(s) 100 may include one or more integrated BNG devices (shown in FIGS. 1A-1D as integrated BNG devices 1 and 2), one or more distributed BNG user plane devices (shown in FIGS. 1A-1D as distributed BNG user plane devices 1 through N, where N≥1), and/or a plurality of user devices (shown in FIGS. 1A-1D as user devices 1 through M, where M≥2), which are described in more detail below in connection with FIGS. 2-4.

In some implementations, an integrated BNG device (e.g., one of the integrated BNG devices 1 and 2) may provide a BNG control plane and one or more BNG user planes (e.g., the BNG control plane and the one or more BNG user planes are "integrated" in the integrated BNG device). Accordingly, the integrated BNG device provides the BNG control plane for the one or more BNG user planes of the integrated BNG device. In this way, the integrated BNG device may perform control plane functions and user plane functions for a set of user devices (e.g., one or more user devices, such as user device M shown in FIG. 1B) within a single device.

In some implementations, the integrated BNG device may provide a BNG control plane for one or more distributed BNG user plane devices (e.g., that are separate from the integrated BNG device, and therefore "distributed"). Accordingly, the integrated BNG device may be configured to perform one or more BNG control plane functions for each of the one or more distributed BNG user plane devices. Each of the one or more distributed BNG user plane devices may be configured to perform one or more BNG user plane functions for another set of user devices (e.g., one or more other user devices). In this way, the integrated BNG device may provide a control plane for the one or more BNG user planes of the integrated BNG device and for the one or more distributed BNG user plane devices.

As shown in FIG. 1A, the integrated BNG device 1 may provide a BNG control plane for the distributed BNG user plane devices 1 through N. Accordingly, the integrated BNG device 1 may be respectively connected to each of the distributed BNG user plane devices 1 through N via one or more interfaces. For example, as shown in FIG. 1A, the integrated BNG device 1 may be connected to the distributed BNG user plane device 1 via one or more interfaces between the integrated BNG device 1 and the distributed BNG user plane device 1 (e.g., the A-1, B-1, and C-1 interfaces), and the integrated BNG device 1 may be connected to the distributed BNG user plane device N via one or more interfaces between the integrated BNG device 1 and the distributed BNG user plane device N (e.g., interfaces A-N, B-N, and C-N).

In some implementations, to provide a BNG control plane for a particular distributed BNG user plane device (e.g., of the distributed BNG user plane devices 1 through N), the integrated BNG device 1 may communicate information with the particular distributed BNG user plane device via the one or more interfaces between the integrated BNG device 1 and the particular distributed BNG user plane device. For example, the integrated BNG device 1 may communicate management information, control packets, and/or session control and state information with the particular distributed BNG user plane device via the one or more interfaces between the integrated BNG device 1 and the particular distributed BNG user plane device. The management information may include, for example, configuration information for configuring the particular distributed BNG user plane device (e.g., that includes routing protocol configurations, quality of service (QoS) policy templates, notifications, alerts, or other configuration information) and/or operational and resource information associated with the particular distributed BNG user plane device (e.g., that includes operational data, resource data, and/or other information related to the distributed BNG user plane device). The control packets may include, for example, at least one request packet related to establishing a communication session for a user device (e.g., that includes an Ethernet active discovery initiation (PPPoE-PADI) packet, a dynamic host configuration protocol discover (DHCP-discover) packet, or a similar packet related to establishing the communication session), and/or at least one response packet related to establishing the communication session for the user device (e.g., that includes an Ethernet active discovery offer (PPPoE-PADO) packet, a dynamic host configuration protocol offer (DHCP-offer) packet, or a similar packet related to establishing the communication session). The session control and state information may include, for example, information indicating states to be implemented by the particular distributed BNG user plane device (e.g., where a state includes one or more traffic detection and forwarding rules, one or more filtering rules, one or more service level agreement (SLA) rules, one or more statistics collection rules, one or more credit control rules, one or more traffic mirroring rules, one or more application aware policies, and/or one or more lawful interception rules) and/or status information related to states that are implemented by the particular distributed BNG user plane device (e.g., that indicates whether respective rules of the states are currently implemented by the particular distributed BNG user plane device).

As shown by the reference number 102, when the particular distributed BNG user plane device is the distributed BNG user plane device 1, the integrated BNG device 1 may communicate the management information with the distributed BNG user plane device 1 via the A-1 interface between the integrated BNG device 1 and the distributed BNG user plane device 1. For example, the integrated BNG device 1 may send, to the distributed BNG user plane device 1 and via the A-1 interface, configuration information for configuring the distributed BNG user plane device 1, and/or the distributed BNG user plane device 1 may send, to the integrated BNG device and via the A-1 interface, operational and resource information associated with the distributed BNG user plane device 1. Accordingly, the A-1 interface may be termed a distributed BNG management interface (Mi).

As shown by the reference number 104, the integrated BNG device 1 may communicate the control packets with the distributed BNG user plane device 1 via the B-1 interface between the integrated BNG device 1 and the distributed BNG user plane device 1. For example, the distributed BNG user plane device 1 may send, to the integrated BNG device 1 and via the B-1 interface, at least one request packet related to establishing a communication session for a user device, and/or the integrated BNG device 1 may send, to the distributed BNG user plane device 1 and via the B-1 interface, at least one response packet related to establishing the communication session for the user device (e.g., as further described herein in relation to FIG. 1B). Accordingly, the B-1 interface may be termed a distributed BNG control packet redirection interface (CPRi).

As shown by the reference number 106, the integrated BNG device 1 may communicate the session control and state information with the distributed BNG user plane device 1 via the C-1 interface between the integrated BNG device 1 and the distributed BNG user plane device 1. For example, the integrated BNG device 1 may send, to the distributed BNG user plane device 1 and via the C-1 interface, information indicating forwarding states to be implemented by the distributed BNG user plane device 1, and/or the distributed BNG user plane device 1 may send, to the integrated BNG device and via the C-1 interface, status information related to states implemented by the distributed BNG user plane device 1. Accordingly, the C-1 interface may be termed a distributed BNG state control interface (SCi).

Figure 1B:
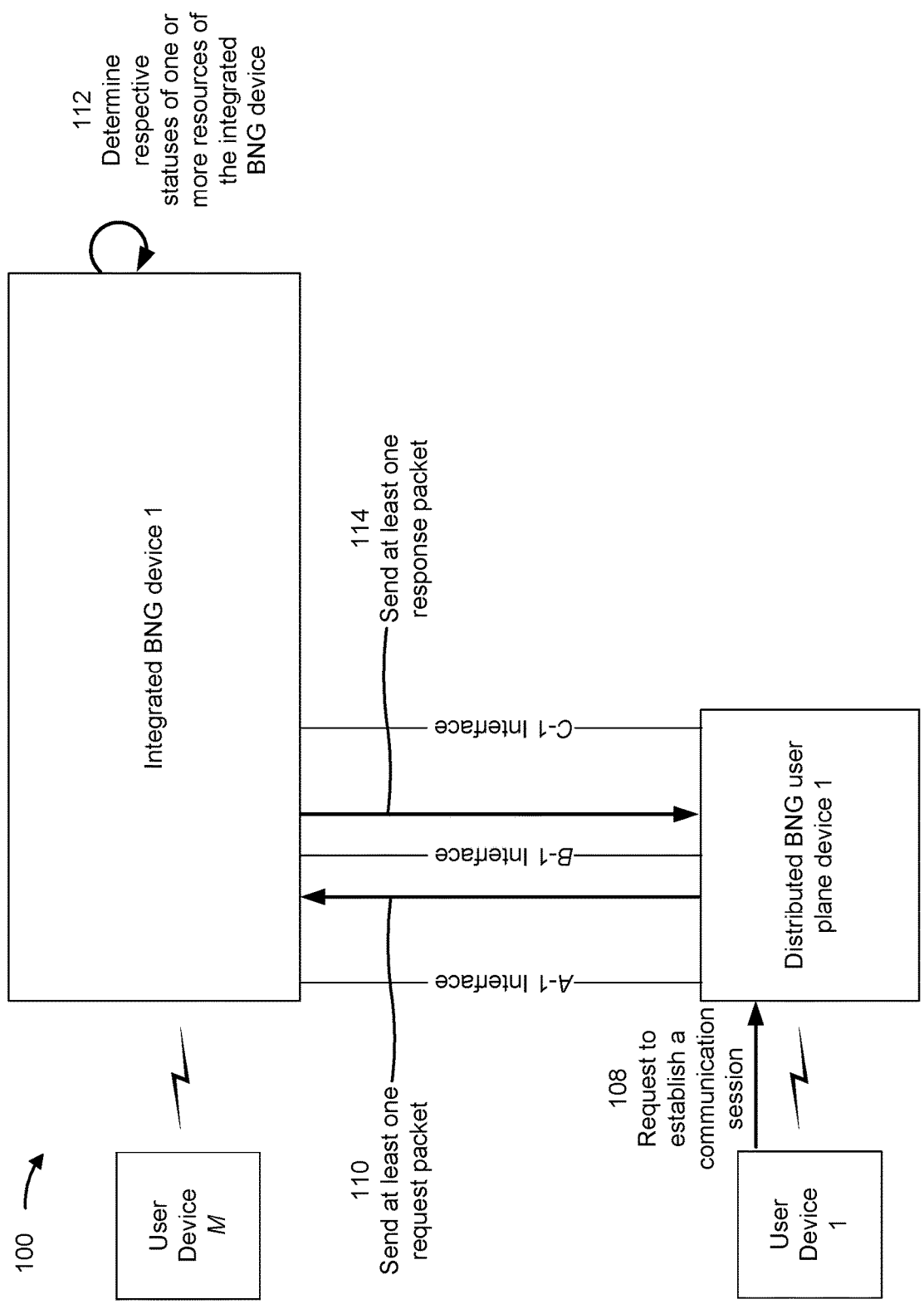

In some implementations, a user device may initiate a process to establish a communication session for the user device (e.g., to access a data network associated with the distributed BNG environment). As shown in FIG. 1B, and by reference number 108, the user device 1 may send a request to establish the communication session to the distributed BNG user plane device 1. Accordingly, as shown by reference number 110, the distributed BNG user plane device 1 may send (e.g., via the B-1 interface) at least one request packet related to establishing the communication session for the user device 1 to the integrated BNG device 1 (e.g., in a similar manner as that described herein in relation to FIG. 1A and reference number 104).

As shown by reference number 112, the integrated BNG device 1 may determine respective statuses of one or more resources of the integrated BNG device 1 (e.g., based on receiving the at least one request packet). For example, the integrated BNG device 1 may determine respective utilization rates of one or more resources (e.g., processing resources, memory resources, networking resources, or other resources) of the integrated BNG device 1. Accordingly, the integrated BNG device 1 may determine, based on the respective statuses of the one or more resources of the integrated BNG device 1, whether the integrated BNG device 1 is to support the communication session for the user device 1 (e.g., whether the integrated BNG device 1 is to provide a control plane for the distributed BNG user plane device 1 to support the communication session). For example, the integrated BNG device 1 may determine that integrated BNG device 1 is to support the communication session based on determining that a utilization rate of a resource of the integrated BNG device 1 satisfies (e.g., is less than or equal to) a utilization threshold (e.g., that is less than or equal to 50%, 75%, 85%, or 95%, among other examples). Alternatively, the integrated BNG device 1 may determine that integrated BNG device 1 is to not support the communication session based on determining that a utilization rate of the resource of the integrated BNG device 1 does not satisfy the utilization threshold.

Additionally, or alternatively, the integrated BNG device 1 may communicate with an authentication device (e.g., that is included in a service provider network associated with the integrated BNG device 1) to determine whether the user device 1 is an authenticated user device (e.g., whether the user device 1 is a subscriber of the service provider). For example, the integrated BNG device 1 may provide information identifying the user device 1 (e.g., that is included in the at least one request packet) to the authentication device, which may thereby provide an indication of whether the user device 1 is an authenticated user device. Accordingly, the integrated BNG device 1 may determine, based on an indication that the user device 1 is an authenticated user device, that the integrated BNG device 1 is to support the communication session for the user device 1. Alternatively, the integrated BNG device 1 may determine, based on an indication that the user device 1 is not an authenticated user device, that the integrated BNG device 1 is to not support the communication session for the user device 1.

As shown by reference number 114, the integrated BNG device 1 may send (e.g., via the interface B-1) at least one response packet related to establishing the communication session for the user device 1 to the distributed BNG user plane device 1 (e.g., in a similar manner as that described herein in relation to FIG. 1A and reference number 104). The at least one response packet may indicate that integrated BNG device 1 is to support the communication session for the user device 1 (e.g., based on the integrated BNG device 1 determining that the integrated BNG device 1 is to support the communication session for the user device 1). Accordingly, the integrated BNG device 1 and the distributed BNG user plane device 1 may communicate management information, control packets, and/or session control and state information (e.g., as described herein in relation to FIG. 1A) to establish and/or support the communication session for the user device 1 (and to cause the integrated BNG device 1 to provide a control plane for the distributed BNG user plane device 1 to support the communication session). Alternatively, the at least one response packet may indicate that integrated BNG device 1 is to not support the communication session for the user device 1 (e.g., based on the integrated BNG device 1 determining that the integrated BNG device 1 is to not support the communication session for the user device 1). Accordingly, the integrated BNG device 1 and the distributed BNG user plane device 1 may cease communicating with each other in relation to the communication session for the user device 1.

Figure 1C:
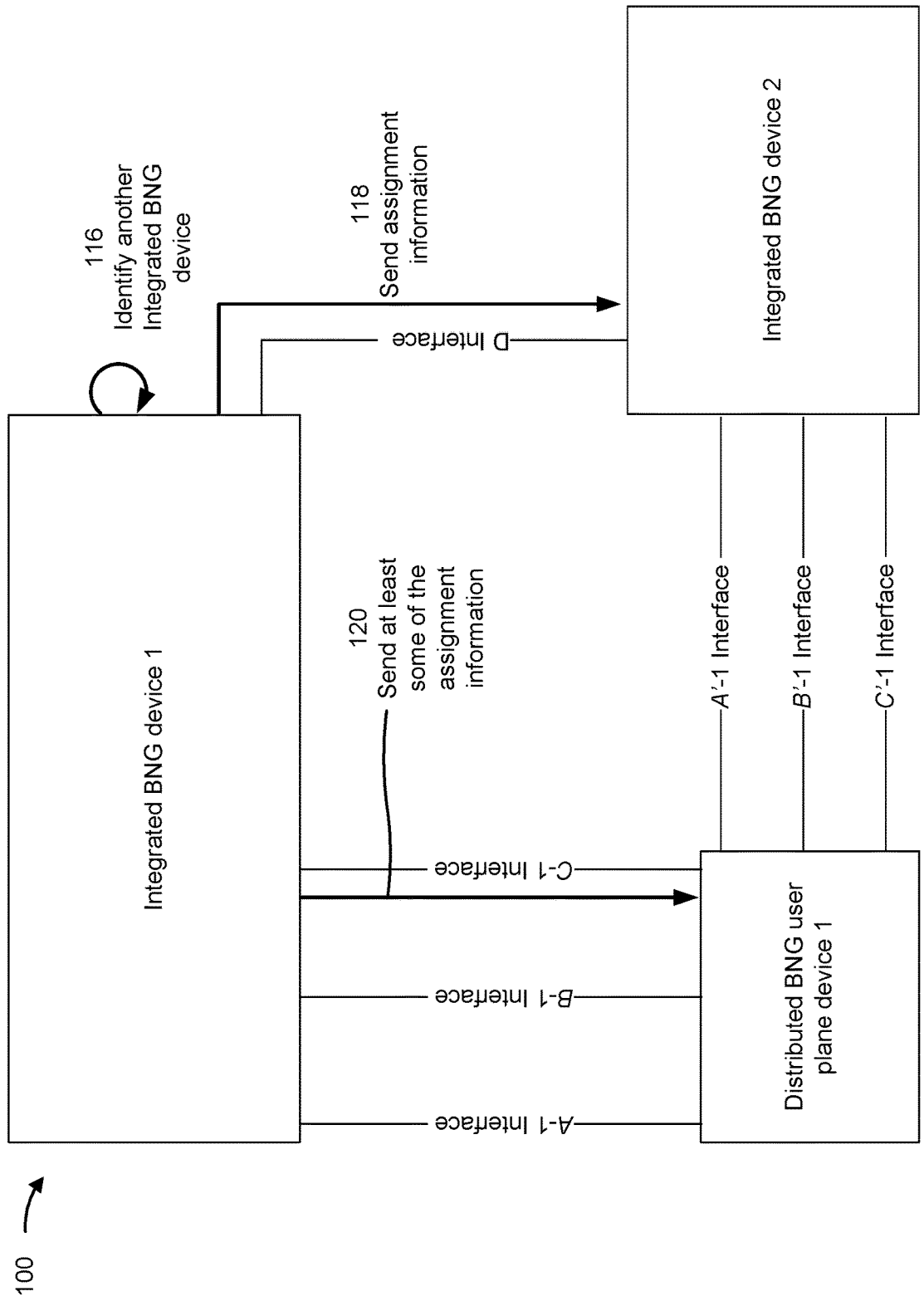
Figure 1D:
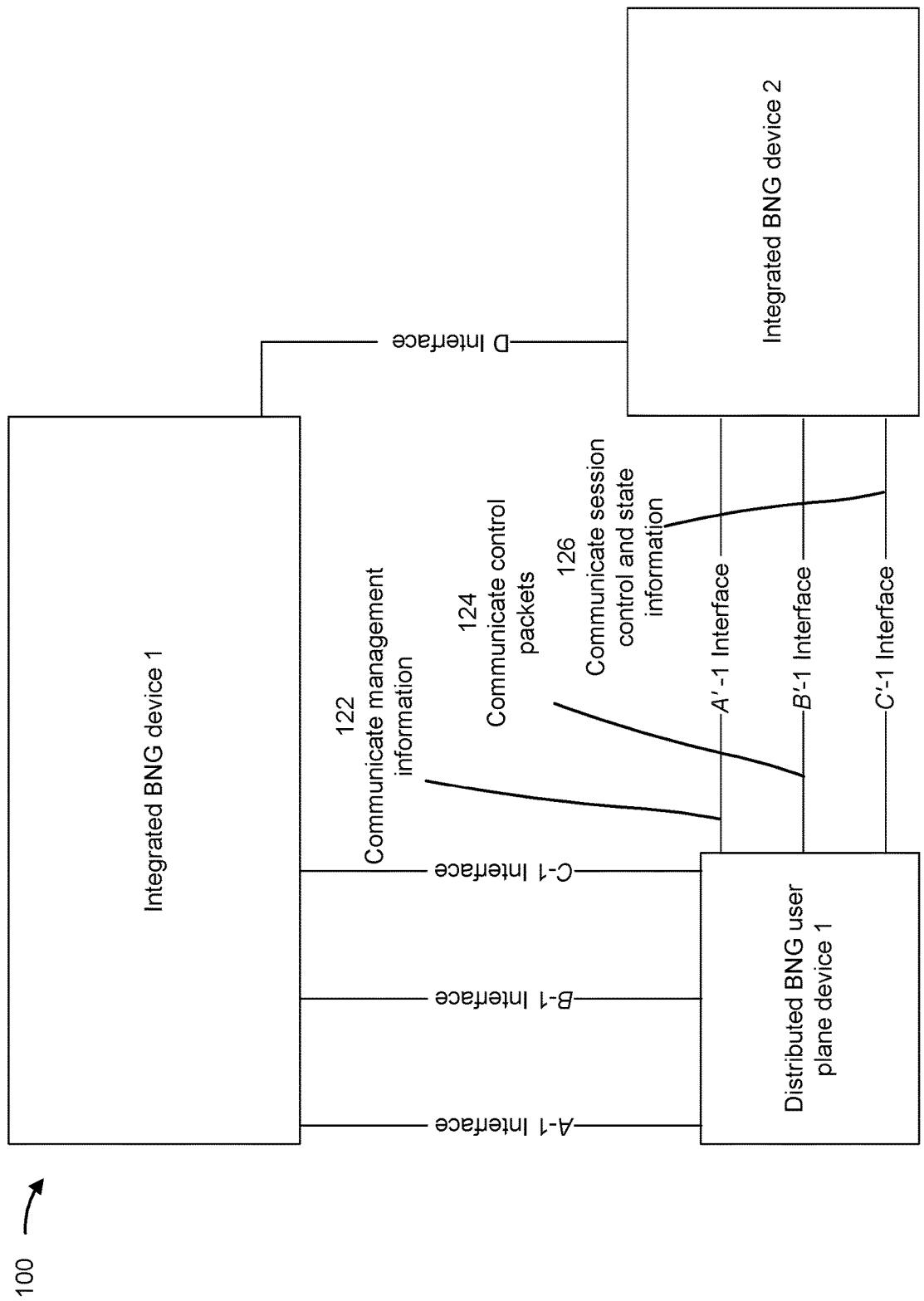

In some implementations, the distributed BNG user plane device 1 (e.g., based on receiving at least one response packet from the integrated BNG device 1 that indicates that the integrated BNG device 1 is to not support the communication session for the user device 1) may communicate with another integrated BNG device (e.g., the integrated BNG device 2) to establish and/or support a communication session for the user device 1 (e.g., and to cause the other integrated BNG device to provide a control plane for the distributed BNG user plane device 1 to support the communication session, as further described herein in relation to FIG. 1D).

Additionally, or alternatively, as shown in FIG. 1C and by reference number 116, the integrated BNG device 1 may identify another integrated BNG device (e.g., that is associated with the distributed BNG environment), such as the integrated BNG device 2. The integrated BNG device 1 may be connected to the integrated BNG device 2 via an interface between the integrated BNG device 1 and the integrated BNG device 2 (e.g., the D interface shown in FIG. 1C), which may be separate and/or distinct from interfaces between the integrated BNG device 1 and the distributed BNG user plane device 1 (e.g., the A-1, B-1, and C-1 interfaces). Accordingly, as shown by reference number 118, the distributed BNG user plane device may send (e.g., via the D interface and based on the integrated BNG device 1 determining that the integrated BNG device 1 is to not support the communication session for the user device 1) assignment information to the integrated BNG device 2. The assignment information may indicate, for example, that the integrated BNG device 2 is to support the communication session for the user device 1. Additionally, or alternatively, as shown by reference number 120, the integrated BNG device 1 may send at least some of the assignment information to the distributed BNG user plane device 1. For example, the integrated BNG device 1 may send (e.g., via the C-1 interface) information identifying the integrated BNG device 2 (e.g., for the distributed BNG user plane device 1 to communicate with the integrated BNG device 2 to establish and/or support a communication session for the user device 1, as described elsewhere herein).

In some implementations, the integrated BNG device 1 may determine respective statuses of one or more resources of the integrated BNG device 1 (e.g., in a similar manner as that described herein in relation to FIG. 1B and reference number 112) and may thereby identify another integrated BNG device (e.g., in a similar manner as that described herein in relation to FIG. 1C and reference number 116) for providing another BNG control plane for a portion of one or more distributed BNG user plane devices (e.g., for which the integrated BNG device provides a control plane). For example, the integrated BNG device 1 may determine respective utilization rates of one or more resources (e.g., processing resources, memory resources, networking resources, or other resources) of the integrated BNG device 1 and may determine that integrated BNG device 1 is overloaded based on determining that a utilization rate of a resource of the integrated BNG device 1 satisfies (e.g., is greater than or equal to) a utilization threshold (e.g., that is less than or equal to 50%, 75%, 85%, or 95%, among other examples). Accordingly, the integrated BNG device 1 may identify the integrated BNG device 2 for providing another BNG control plane for a portion of the one or more distributed BNG user plane devices that are supported by the integrated BNG device 1 (e.g., a portion of distributed BNG user plane devices 1 through N, which, for example, includes the distributed BNG user plane device 1). Accordingly, the integrated BNG device 1 may send (e.g., via the D interface), to the integrated BNG device 2, assignment information indicating the portion of the one or more distributed BNG user plane devices (e.g., in a similar manner as that described herein in relation to FIG. 1C and reference number 118) and/or may send to each distributed BNG user plane device of the portion of the one or more distributed BNG user plane devices at least some of the assignment information (e.g., in a similar manner as that described herein in relation to FIG. 1C and reference number 120).

Accordingly, as shown in FIG. 1D, the integrated BNG device 2 may communicate with each distributed BNG user plane device, of the portion of the one or more distributed BNG user plane devices, via respective interfaces between the integrated BNG device 2 and the distributed BNG user plane device (e.g., to provide a BNG control plane for the portion of the one or more distributed BNG user plane devices). For example, as shown by reference number 122, the integrated BNG device 2 may communicate management information with the distributed BNG user plane device 1 via an A'-1 interface between the integrated BNG device 2 and the distributed BNG user plane device 1 (e.g., in a similar manner as that described herein in relation to FIG. 1A and reference number 102); as shown by reference number 124, the integrated BNG device 2 may communicate control packets with the distributed BNG user plane device 1 via a B'-1 interface between the integrated BNG device 2 and the distributed BNG user plane device 1 (e.g., in a similar manner as that described herein in relation to FIG. 1A and reference number 104); and/or, as shown by reference number 126, the integrated BNG device 2 may communicate session control and state information with the distributed BNG user plane device 1 via a C'-1 interface between the integrated BNG device 2 and the distributed BNG user plane device 1 (e.g., in a similar manner as that described herein in relation to FIG. 1A and reference number 106) to cause the integrated BNG device to provide a BNG control plane for the distributed BNG user plane device 1.

Figure 2:
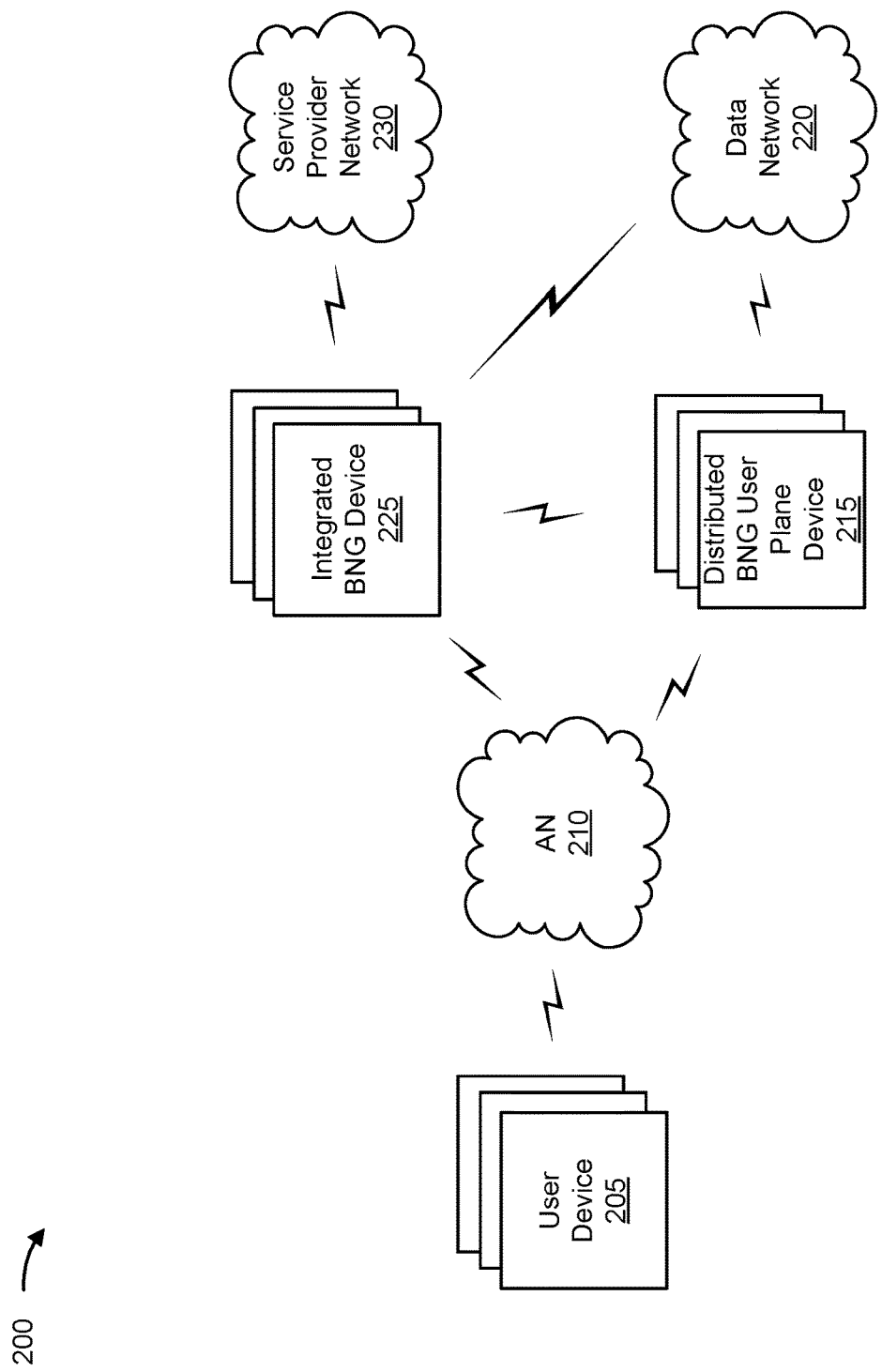
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include multiple user devices 205, an access network (AN) 210, multiple distributed BNG user plane devices 215, a data network 220, multiple integrated BNG devices 225, and a service provider network 230. Devices and/or networks of example environment 200 may interconnect via wired connections, wireless connections, or a combination of wired and wireless connections.

User device 205 includes one or more devices capable of receiving, generating, storing, processing, and/or providing information, such as information described herein. For example, user device 205 may include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, or a similar type of device. In some implementations, user device 205 may provide and/or receive network traffic to and/or from distributed BNG user plane device 215 via AN 210.

AN 210 includes one or more wired and/or wireless networks. For example, AN 210 may include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. AN 210 may transfer traffic between user device 205, distributed BNG user plane device 215, and/or data network 220.

Distributed BNG user plane device 215 includes one or more devices capable of receiving, processing, storing, routing, and/or providing traffic (e.g., a packet and/or other information or metadata) in a manner described herein. For example, distributed BNG user plane device 215 may include a router, such as a label switching router (LSR), a label edge router (LER), an ingress router, an egress router, a provider router (e.g., a provider edge router or a provider core router), a virtual router, or another type of router. Additionally, or alternatively, distributed BNG user plane device 215 may include a gateway, a switch, a firewall, a hub, a bridge, a reverse proxy, a server (e.g., a proxy server, a cloud server, or a data center server), a load balancer, and/or a similar device. In some implementations, distributed BNG user plane device 215 may be a physical device implemented within a housing, such as a chassis. In some implementations, distributed BNG user plane device 215 may be a virtual device implemented by one or more computing devices of a cloud computing environment or a data center. In some implementations, a group of distributed BNG user plane devices 215 may be a group of data center nodes that are used to route traffic flow through a network. Distributed BNG user plane device 215 may transfer traffic between user device 205 and/or data network 220. Distributed BNG user plane device 215 may perform user plane functionality for a distributed BNG environment. In some implementations, distributed BNG user plane device 215 may communicate with integrated BNG device 225 via multiple interfaces, as described herein.

Data network 220 includes one or more wired and/or wireless data networks. For example, data network 220 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

Integrated BNG device 225 includes one or more devices capable of receiving, generating, storing, processing, providing, and/or routing information, as described elsewhere herein. Integrated BNG device 225 may include a communication device and/or a computing device. For example, integrated BNG device 225 may include a server, such as an application server, a client server, a host server, a proxy server, a virtual server (e.g., executing on computing hardware), or a server in a cloud computing system. In some implementations, integrated BNG device 225 includes computing hardware used in a cloud computing environment. Integrated BNG device 225 may perform control plane functionality for a distributed BNG environment. Control plane functionality includes multiple control plane functions, such as subscriber session termination, performing signaling protocols such as Point-to-Point Protocol over Ethernet (PPPoE), IP over Ethernet (IPoE), IP address assignment and management, authentication/authorization/accounting (AAA), policy enforcement, gateway operations, lawful intercept, local management, keep-alive message processing, and configuring distributed BNG user plane device 215. In some implementations, integrated BNG device 225 may communicate with distributed BNG user plane device 215 via multiple interfaces, as described herein.

Service provider network 230 includes one or more wired and/or wireless networks (e.g., that are associated with a service provider, such as an Internet service provider (ISP)). For example, the service provider network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
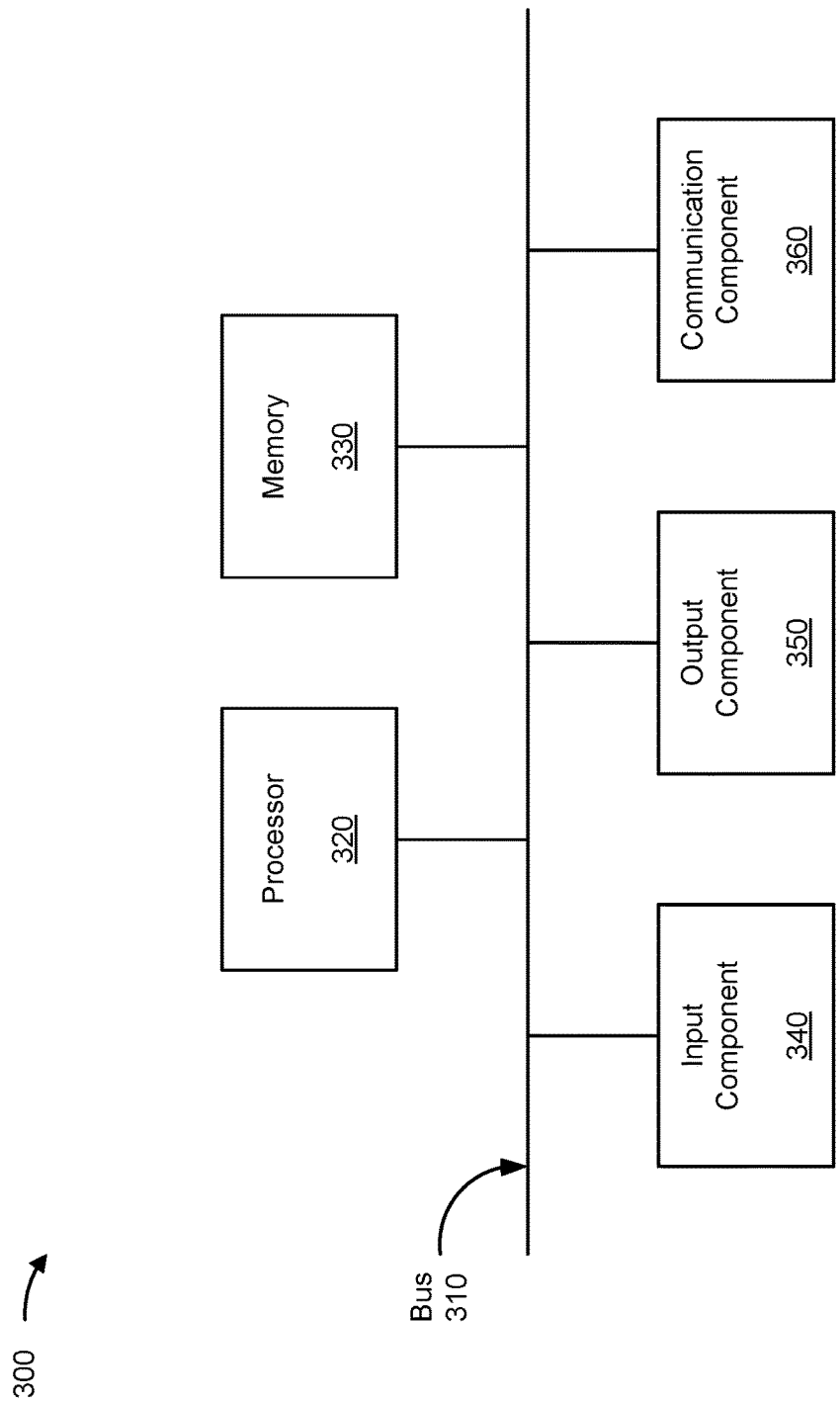
FIGS. 3-4 are diagrams of example components of one or more devices of FIG. 2.

FIG. 3 is a diagram of example components of a device 300, which may correspond to user device 205, distributed BNG user plane device 215, and/or integrated BNG device 225. In some implementations, user device 205, distributed BNG user plane device 215, and/or integrated BNG device 225 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
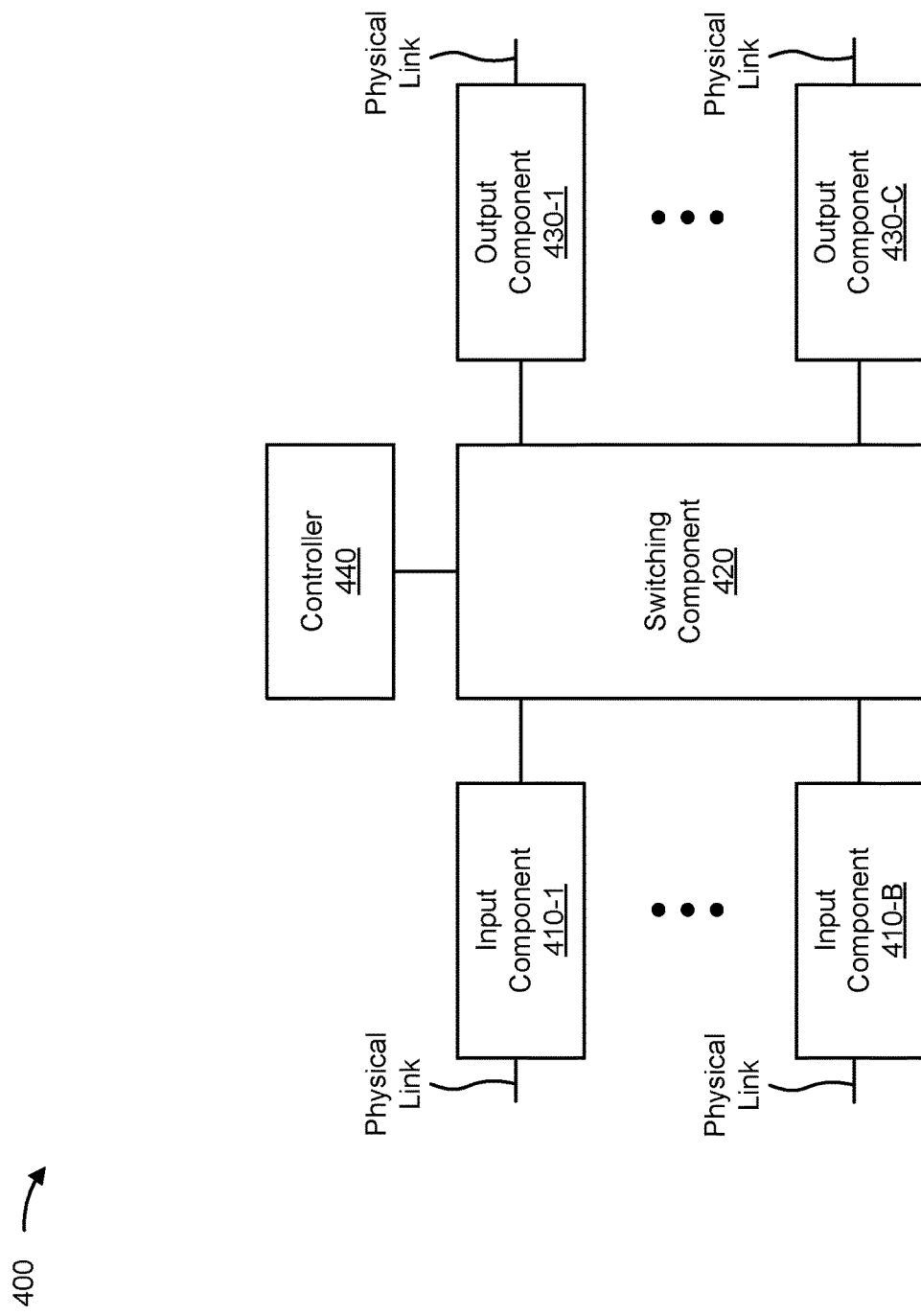

FIG. 4 is a diagram of example components of a device 400. Device 400 may correspond to user device 205, distributed BNG user plane device 215, and/or integrated BNG device 225. In some implementations, user device 205, distributed BNG user plane device 215, and/or integrated BNG device 225 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
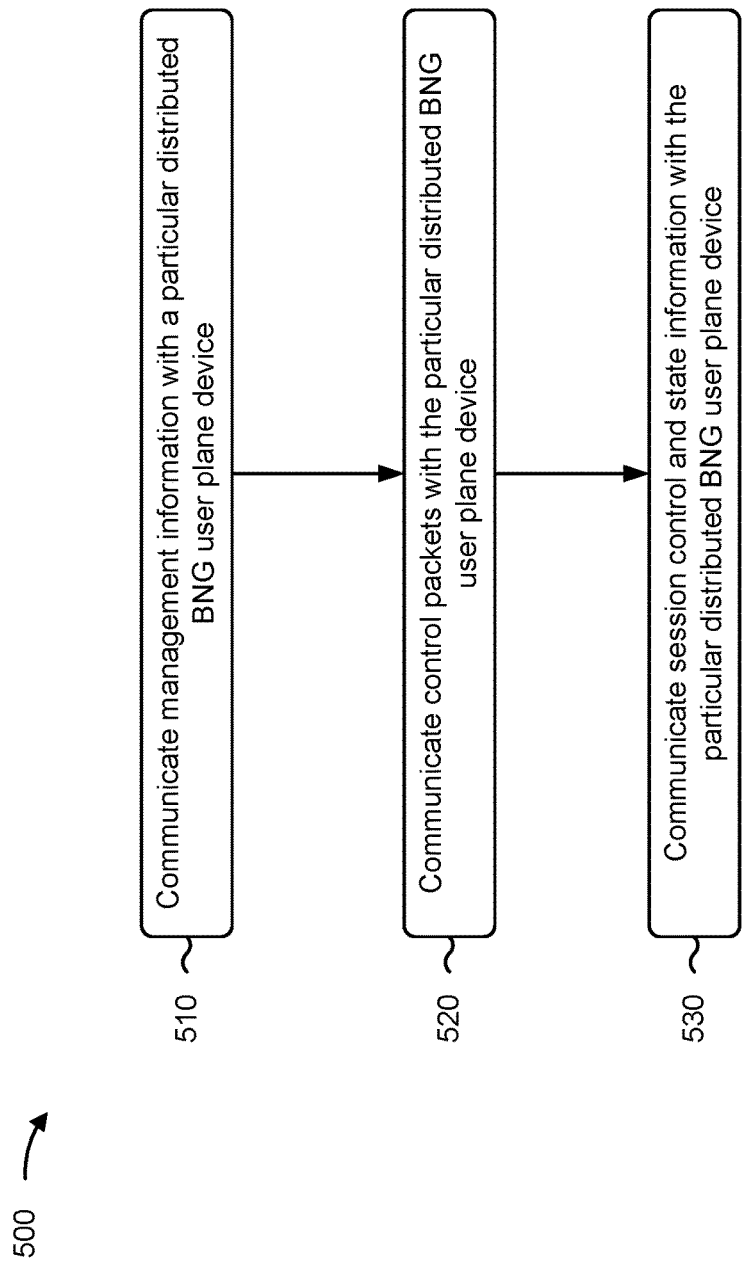
FIG. 5 is a flowchart of example processes relating to an integrated BNG device providing a BNG control plane for one or more distributed BNG user plane devices.

FIG. 5 is a flowchart of an example process 500 associated with an integrated BNG device providing a BNG control plane for one or more distributed BNG user plane devices. In some implementations, one or more process blocks of FIG. 5 are performed by the integrated BNG device (e.g., integrated BNG device 225). In some implementations, one or more process blocks of FIG. 5 are performed by another device or a group of devices separate from or including the integrated BNG device, such as a user device (e.g., user device 205) and/or a distributed BNG user plane device (e.g., distributed BNG user plane device 215). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include communicating management information with a particular distributed BNG user plane device (block 510). For example, the integrated BNG device may communicate management information with a particular distributed BNG user plane device of the one or more distributed BNG user plane devices, as described above. In some implementations, the management information is communicated via a first interface between the integrated BNG device and the particular distributed BNG user plane device.

As further shown in FIG. 5, process 500 may include communicating control packets with the particular distributed BNG user plane device (block 520). For example, the integrated BNG device may communicate control packets with the particular distributed BNG user plane device, as described above. In some implementations, the control packets is communicated via a second interface between the integrated BNG device and the particular distributed BNG user plane device.

As further shown in FIG. 5, process 500 may include communicating session control and state information with the particular distributed BNG user plane device (block 530). For example, the integrated BNG device may communicate session control and state information with the particular distributed BNG user plane device, as described above. In some implementations, the session control and state information is communicated via a third interface between the integrated BNG device and the particular distributed BNG user plane device.

Process 500 may include additional implementations, such as any single implementation or any combination of implementations described below and/or in connection with one or more other processes described elsewhere herein.

In a first implementation, the management information includes at least one of information for configuring the particular distributed BNG user plane device, or operational and resource information associated with the particular distributed BNG user plane device.

In a second implementation, alone or in combination with the first implementation, communicating the management information includes sending, to the particular distributed BNG user plane device and via the first interface, configuration information for configuring the particular distributed BNG user plane device, or receiving, from the particular distributed BNG user plane device and via the first interface, operational and resource information associated with the particular distributed BNG user plane device.

In a third implementation, alone or in combination with one or more of the first and second implementations, the control packets includes at least one of at least one request packet related to establishing a communication session for a user device, or at least one response packet related to establishing the communication session for the user device.

In a fourth implementation, alone or in combination with one or more of the first through third implementations, communicating the control packets includes receiving, from the particular distributed BNG user plane device and via the second interface, at least one request packet related to establishing a communication session for a user device, or sending, to the particular distributed BNG user plane device and via the second interface, at least one response packet related to establishing the communication session for the user device.

In a fifth implementation, alone or in combination with one or more of the first through fourth implementations, the session control and state information includes at least one of information indicating states to be implemented by the particular distributed BNG user plane device, or information related to states that are implemented by the particular distributed BNG user plane device.

In a sixth implementation, alone or in combination with one or more of the first through fifth implementations, communicating the session control and state information includes sending, to the particular distributed BNG user plane device and via the third interface, information indicating forwarding states to be implemented by the particular distributed BNG user plane device, or receiving, from the particular distributed BNG user plane device and via the third interface, status information related to states implemented by the particular distributed BNG user plane device.

In a seventh implementation, alone or in combination with one or more of the first through sixth implementations, process 500 includes receiving, from the particular distributed BNG user plane device and via the second interface, at least one request packet related to establishing a communication session for a user device; determining, based on the at least one request packet, respective statuses of one or more resources of the integrated BNG device; determining, based on the respective statuses of the one or more resources, that the integrated BNG device is to not support the communication session for the user device; and sending, to the particular distributed BNG user plane device and via the second interface, at least one response packet that indicates that the integrated BNG device is to not support the communication session for the user device.

In an eighth implementation, alone or in combination with one or more of the first through seventh implementations, process 500 includes sending, to another integrated BNG device and via a fourth interface, assignment information indicating that the other integrated BNG device is to support the communication session for the user device, and sending, to the particular distributed BNG user plane device and via the second interface, at least some of the assignment information.

In a ninth implementation, alone or in combination with one or more of the first through eighth implementations, process 500 includes determining respective statuses of one or more resources of the integrated BNG device; identifying, based on the respective statuses of the one or more resources, another integrated BNG device for providing another BNG control plane for a portion of the one or more distributed BNG user plane devices, wherein the portion of the one or more distributed BNG user plane devices includes the particular distributed BNG user plane device; sending, to the other integrated BNG device and via a fourth interface, assignment information indicating the portion of the one or more distributed BNG user plane devices; and sending, to the particular distributed BNG user plane device, the assignment information.

In a tenth implementation, alone or in combination with one or more of the first through ninth implementations, communicating the control packets includes receiving, from the particular distributed BNG user plane device via the second interface, at least one request packet related to establishing a communication session for a user device; communicating, with an authentication device, to determine whether the user device is an authenticated user device; and sending, based on determining whether the user device is an authenticated user device, and to the particular distributed BNG user plane device via the second interface, at least one response packet related to establishing the communication session for the user device.

In an eleventh implementation, alone or in combination with one or more of the first through tenth implementations, process 500 includes determining respective statuses of one or more resources of the integrated BNG device; identifying, based on the respective statuses of the one or more resources, another integrated BNG device; sending, to the other integrated BNG device and via a fourth interface, assignment information indicating that the other integrated BNG device is to provide another BNG control plane for the particular distributed BNG user plane device; and sending, to the particular distributed BNG user plane device, at least some of the assignment information.

In a twelfth implementation, alone or in combination with one or more of the first through eleventh implementations, process 500 includes receiving, from another integrated BNG device and via a fourth interface, assignment information indicating that the integrated BNG device is to provide the BNG control plane for one or more additional distributed BNG user plane devices, and communicating, based on the assignment information and with each additional BNG user plane device of the one or more additional distributed BNG user plane devices, additional management information, additional control packets, and additional session control and state information via respective interfaces between the integrated BNG device and the additional BNG user plane.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An integrated broadband network gateway (BNG) device for providing a BNG control plane for one or more distributed BNG user plane devices, comprising:
    one or more memories; and
    one or more processors to:
        communicate management information with a particular distributed BNG user plane device of the one or more distributed BNG user plane devices,
            wherein the management information is communicated via a first interface between the integrated BNG device and the particular distributed BNG user plane device;
        communicate control packets with the particular distributed BNG user plane device,
            wherein the control packets is communicated via a second interface between the integrated BNG device and the particular distributed BNG user plane device; and communicate session control and state information with the particular distributed BNG user plane device,
   wherein the session control and state information is communicated via a third interface between the integrated BNG device and the particular distributed BNG user plane device.

2. The integrated BNG device of claim 1, wherein the integrated BNG device provides the BNG control plane for one or more user planes provided by the integrated BNG device.

3. The integrated BNG device of claim 1, wherein the management information includes at least one of:
   configuration information for configuring the particular distributed BNG user plane device; or
   operational and resource information associated with the particular distributed BNG user plane device.

4. The integrated BNG device of claim 1, wherein the one or more processors, when communicating the management information, are to at least one of:
   send, to the particular distributed BNG user plane device and via the first interface, configuration information for configuring the particular distributed BNG user plane device; or
   receive, from the particular distributed BNG user plane device and via the first interface, operational and resource information associated with the particular distributed BNG user plane device.

5. The integrated BNG device of claim 1, wherein the control packets includes at least one of:
   at least one request packet related to establishing a communication session for a user device; or
   at least one response packet related to establishing the communication session for the user device.

6. The integrated BNG device of claim 1, wherein the one or more processors, when communicating the control packets, are to at least one of:
   receive, from the particular distributed BNG user plane device and via the second interface, at least one request packet related to establishing a communication session for a user device; or
   send, to the particular distributed BNG user plane device and via the second interface, at least one response packet related to establishing the communication session for the user device.

7. The integrated BNG device of claim 1, wherein the session control and state information includes at least one of:
   information indicating states to be implemented by the particular distributed BNG user plane device; or
   information related to states that are implemented by the particular distributed BNG user plane device.

8. The integrated BNG device of claim 1, wherein the one or more processors, when communicating the session control and state information, are to at least one of:
   send, to the particular distributed BNG user plane device and via the third interface, information indicating forwarding states to be implemented by the particular distributed BNG user plane device; or
   receive, from the particular distributed BNG user plane device and via the third interface, status information related to states implemented by the particular distributed BNG user plane device.

9. The integrated BNG device of claim 1, wherein the one or more processors are further to:

receive, from the particular distributed BNG user plane device and via the second interface, at least one request packet related to establishing a communication session for a user device;
determine, based on the at least one request packet, respective statuses of one or more resources of the integrated BNG device;
determine, based on the respective statuses of the one or more resources, that the integrated BNG device is to not support the communication session for the user device; and
send, to the particular distributed BNG user plane device and via the second interface, at least one response packet that indicates that the integrated BNG device is to not support the communication session for the user device.

10. The integrated BNG device of claim 9, wherein the one or more processors are further to:
   send, to another integrated BNG device and via a fourth interface, assignment information indicating that the other integrated BNG device is to support the communication session for the user device; and
   send, to the particular distributed BNG user plane device and via the second interface, at least some of the assignment information.

11. The integrated BNG device of claim 1, wherein the one or more processors are further to:
   determine respective statuses of one or more resources of the integrated BNG device;
   identify, based on the respective statuses of the one or more resources, another integrated BNG device for providing another BNG control plane for a portion of the one or more distributed BNG user plane devices,
      wherein the portion of the one or more distributed BNG user plane devices includes the particular distributed BNG user plane device;
   send, to the other integrated BNG device and via a fourth interface, assignment information indicating the portion of the one or more distributed BNG user plane devices; and
   send, to the particular distributed BNG user plane device, the assignment information.

12. A non-transitory computer-readable medium storing a set of instructions, the set of instructions comprising:
   one or more instructions that, when executed by one or more processors of an integrated broadband network gateway (BNG) device, cause the integrated BNG device to:
      communicate management information with a particular distributed BNG user plane device via a first interface between the integrated BNG device and the particular distributed BNG user plane device;
      communicate control packets with the particular distributed BNG user plane via a second interface between the integrated BNG device and the particular distributed BNG user plane device; and
      communicate session control and state information with the particular distributed BNG user plane device via a third interface between the integrated BNG device and the particular distributed BNG user plane device.

13. The non-transitory computer-readable medium of claim 12, wherein the management information includes at least one of:
   configuration information for configuring the particular distributed BNG user plane device; or operational and resource information associated with the particular distributed BNG user plane device.

14. The non-transitory computer-readable medium of claim 12, wherein the control packets includes at least one of:
    at least one request packet related to establishing a communication session for a user device; or
    at least one response packet related to establishing the communication session for the user device.

15. The non-transitory computer-readable medium of claim 12, wherein the one or more instructions, that cause the integrated BNG device to communicate the control packets, cause the integrated BNG device to:
    receive, from the particular distributed BNG user plane device via the second interface, at least one request packet related to establishing a communication session for a user device;
    communicate, with an authentication device, to determine whether the user device is an authenticated user device; and
    send, based on determining whether the user device is an authenticated user device, and to the particular distributed BNG user plane device via the second interface, at least one response packet related to establishing the communication session for the user device.

16. The non-transitory computer-readable medium of claim 12, wherein the session control and state information includes at least one of:
    information indicating states to be implemented by the particular distributed BNG user plane device; or
    status information related to states that are implemented by the particular distributed BNG user plane device.

17. The non-transitory computer-readable medium of claim 12, wherein the integrated BNG device provides a BNG control plane for the particular distributed BNG user plane device,
    wherein the one or more instructions further cause the integrated BNG device to:
        determine respective statuses of one or more resources of the integrated BNG device;
        identify, based on the respective statuses of the one or more resources, another integrated BNG device;
        send, to the other integrated BNG device and via a fourth interface, assignment information indicating that the other integrated BNG device is to provide another BNG control plane for the particular distributed BNG user plane device; and
        send, to the particular distributed BNG user plane device, at least some of the assignment information.

18. The non-transitory computer-readable medium of claim 12, wherein the integrated BNG device provides a BNG control plane for the particular distributed BNG user plane device,
    wherein the one or more instructions further cause the integrated BNG device to:
        receive, from another integrated BNG device and via a fourth interface, assignment information indicating that the integrated BNG device is to provide the BNG control plane for one or more additional distributed BNG user plane devices; and
        communicate, based on the assignment information and with each additional BNG user plane device of the one or more additional distributed BNG user plane devices, additional management information, additional control packets, and additional session control and state information via respective interfaces between the integrated BNG device and the additional BNG user plane.

19. A method for providing a broadband network gateway (BNG) control plane for a particular distributed BNG user plane device, comprising:
    communicating, by an integrated BNG device, management information with the particular distributed BNG user plane device via a first interface between the integrated BNG device and the particular distributed BNG user plane device;
    communicating, by the integrated BNG device, control packets with the particular distributed BNG user plane device via a second interface between the integrated BNG device and the particular distributed BNG user plane device; and
    communicating, by the integrated BNG device, session control and state information with the particular distributed BNG user plane device via a third interface between the integrated BNG device and the particular distributed BNG user plane device.

20. The method of claim 19, further comprising:
    sending, to another integrated BNG device, assignment information indicating that the other integrated BNG device is to provide another BNG control plane for the particular distributed BNG user plane device; and
    sending, to the particular distributed BNG user plane device, at least some of the assignment information.

* * * * *